United States Patent [19]

Wareham

[11] 4,054,376
[45] Oct. 18, 1977

[54] METHOD AND APPARATUS FOR HEATING EYEGLASS FRAMES

[76] Inventor: Richard C. Wareham, 2372 N. 90th St., Milwaukee, Wis. 53227

[21] Appl. No.: 664,534

[22] Filed: Mar. 8, 1976

Related U.S. Application Data

[63] Continuation-in-part of Ser. No. 555,436, March 5, 1975, abandoned.

[51] Int. Cl.² .................................................. G02C 13/00
[52] U.S. Cl. .................................................. 351/178; 81/3.5; 432/15; 432/215; 219/365; 165/104 F
[58] Field of Search ............... 432/5, 7, 14, 15, 28, 432/183–185, 192, 197, 215, 217; 351/178; 264/322, 249; 219/369, 370, 365, 385; 165/104; 81/3.5; 425/384

[56] References Cited

U.S. PATENT DOCUMENTS

| 2,544,514 | 3/1951 | Tasker | 219/385 |
|---|---|---|---|
| 2,710,331 | 6/1955 | Stegeman | 81/3.5 |
| 2,835,483 | 5/1958 | Lindsay | 432/215 |
| 2,836,696 | 5/1958 | Ratchford | 81/3.5 |
| 3,118,773 | 1/1964 | Bennett et al. | 165/104 |
| 3,242,973 | 3/1966 | Neale et al. | 165/104 |
| 3,329,801 | 7/1967 | Shannon et al. | 219/388 |
| 3,564,202 | 2/1971 | Oppenheim | 219/390 |
| 3,804,581 | 4/1974 | Schmalfeld et al. | 432/15 |
| 3,816,705 | 6/1974 | Ebert | 81/3.5 |

OTHER PUBLICATIONS

Glass & Ceramics (U.S.A.), vol. 28, No. 1–2, Jan.–Feb. 1971 Furnace for Heating Feeder Shears by Makhorin et al. pp. 88–90.

*Primary Examiner*—John J. Camby
*Assistant Examiner*—Henry C. Yuen
*Attorney, Agent, or Firm*—Fred Wiviott

[57] ABSTRACT

A method and apparatus for heating articles, such as eyeglass frames, includes a bed of heat retentive beads supported above a plenum chamber by a mesh or screen. Heated air is delivered to the plenum chamber at low velocity and high volume for flowing upwardly through the bed for heating the same. The air is directed through the phenum chamber by bodies which act as baffles as well as a heat sink.

2 Claims, 2 Drawing Figures

METHOD AND APPARATUS FOR HEATING EYEGLASS FRAMES

This application is a continuation-in-part of Ser. No. 555,436, filed Mar. 5, 1975, and now abandoned.

BACKGROUND OF THE INVENTION

The present invention relates generally to the art of heating articles and in particular to heating method and apparatus having particular application for heating eyeglass frames to permit the insertion and removal of lenses.

In the fabrication of eyeglasses, the lens are normally prepared in accordance with the patient's prescription and are thereafter inserted in the frames. In addition, lens are often replaced in a patient's existing frames. When lens are to be inserted into frames, the rims are commonly heated whereby plastic frames become deformable and metallic frames expand. While the frames are in a softened or expanded state, a lens can be snapped into place. One type of prior art apparatus for heating frames comprises a small oven. Such apparatus is not wholly satisfactory, however, because the opening and closing of the oven door makes it difficult to maintain the desired temperature. Another prior art apparatus for heating such frames is to employ a container of particulate which has a heating element disposed therebelow. This apparatus suffers the disadvantage of having substantial gradients from the lower portions of the container to its upper end. Accordingly, it is extremely difficult to obtain uniform heating. As a result, it is common to damage the frames and/or the lens because insertion too deeply into the bed causes overheating. The latter type of apparatus is also employed for sterilizing medical instruments and supplies, but also suffers the disadvantage of non-uniform temperature gradients whereby those particles located adjacent the heater must be heated to an inordinate temperature in order to provide a sufficiently high temperature at the more remote particles.

Another type of heating apparatus is a fluidized bed which consists of a loosely packed mass of solid particles contained in an open topped vessel by a porous plate. Air at high pressure and low volume is delivered to a gas chamber below the plate. This causes the particles to circulate freely and acquire the properties of a liquid. While fluidized bed heaters provide satisfactory heating characteristics, it requires a relatively large and expensive air compressor having substantial power requirements.

OBJECTS OF THE INVENTION

It is a primary object of the present invention to provide a heating apparatus and method for uniformly heating articles.

Another object of the present invention is to provide a heating apparatus and method for heating eyeglass frames.

Yet another object of the present invention is to provide a heating device in which the temperature can be controlled to within preselected limits and in which heat gradients are minimized.

A further object of the invention is to provide a heating device which employs air flow through heat retentive particles wherein a high pressure source is not required.

How these and other objects and advantages of the present invention are accomplished will be described in the following specification taken in conjunction with the accompanying drawings. In general, the invention comprises an open-topped container which is divided by a screen or mesh into an upper receiver for a quantity of heat retentive particles, such as glass beads and a lower plenum chamber. An opening, in the plenum allows heated air to be injected through the screen for uniformly heating the beads. The injected air is heated to the desired temperature and is delivered at low pressure and high flow rate so that the beads are agitated slowly but are not fluidized. An article such as eyeglass frames or surgical instruments can be heated by inserting the article into the heated bed. The movement of air through the bed results in a substantially uniform heating of the particles which is enhanced by slight agitation.

DESCRIPTION OF THE PREFERRED EMBODIMENTS

Figure 1:
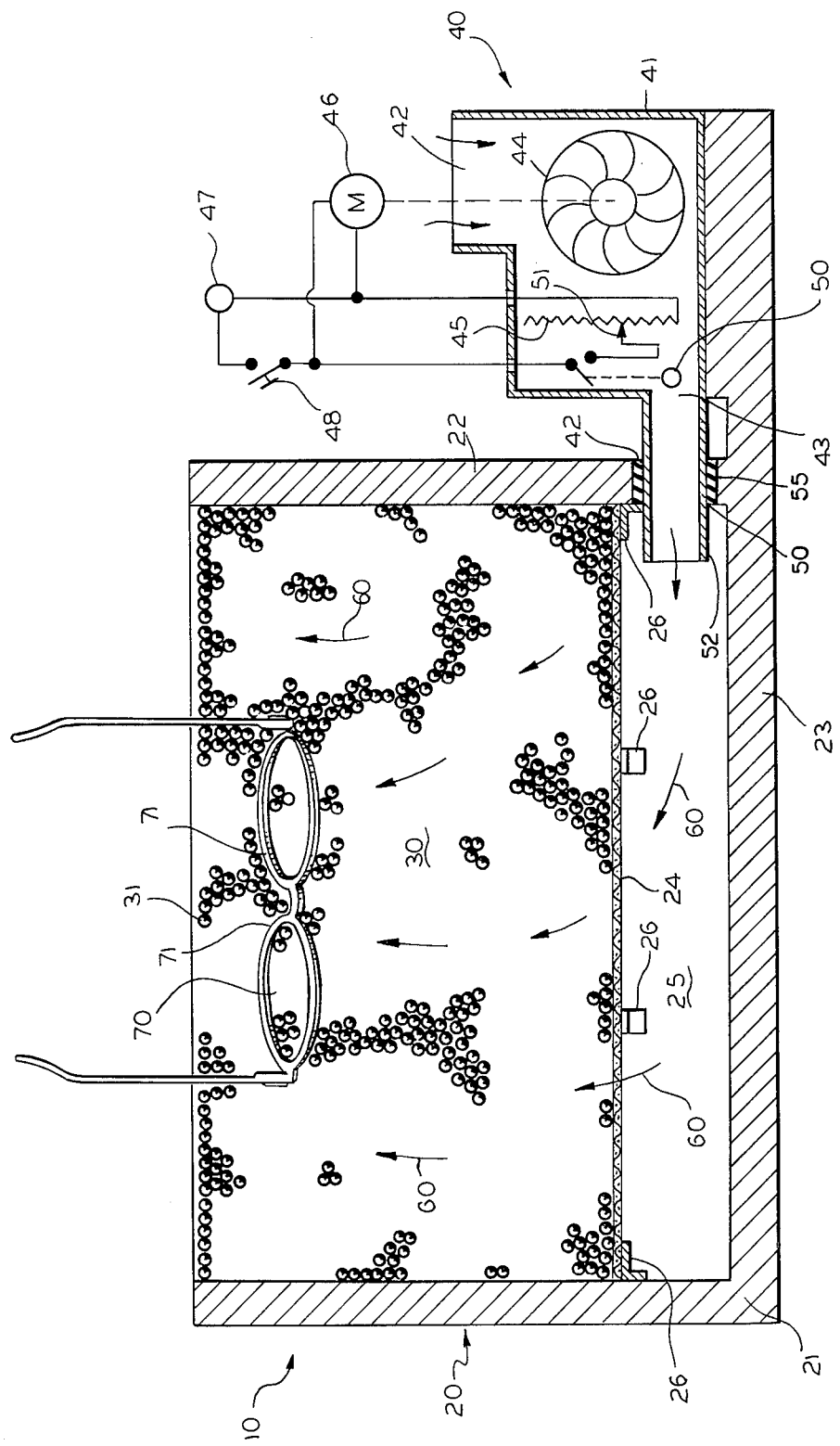
FIG. 1 is a side view, partially in section, of a heating apparatus according to one embodiment of the present invention.

FIG. 1 shows one form of heating device 10 according to the present invention to include a receptacle 20 containing a bed 30 of heat retentive particles, such as beads 31, and a heating apparatus 40 for injecting heated air into the lower portion of receptacle 20 at relatively low pressure and high volume.

Receptacle 20 may be of any desired shape but in the illustrated embodiment comprises a generally rectangular elongate open-topped container formed by front and rear walls (not shown), side walls 21 and 22 and bottom 23. While a number of different materials can be used for constructing the receptacle 20, preferably a heat insulating material is employed. Moreover, the walls and bottom of receptacle 20 can be solid or hollow, in the latter case it being preferable to fill the voids in the walls with heat insulating material.

Above the bottom 23 of the receptacle 20 and extending thereacross is a generally horizontally extending foraminous member 24 which defines, together with the bottom and vertical walls of receptacle 20, a plenum 25. Member 24 may take any convenient form, such as a woven mesh or screen and may be held in by any suitable means, such as, bracket 26 affixed to the inside surface of the walls of receptacle 20.

Disposed in receptacle 20 above member 24 is a quantity of heat retentive beads 31. The beads 31 may have any convenient shape, but preferably do not have sharp discontinuities in their outer surface, particularly for eyeglass frame applications. The size, shape and materials to be used for beads 31 can vary depending on material to be heated. However, for purposes of illustration, the beads are spherical glass beads which is especially useful in a device designed for heating eyeglass frames because the round glass beads are less likely to scratch the frames and lens than are beads of other shapes. The mesh size of the screen will be such that the beads do not pass therethrough. The beads 31 may be hollow or solid and are preferably large enough so that they are not blown from container 20 but should be small enough to insure sufficiently close points of contact with the frame so as to insure uniform heating. Also, the bead size should be sufficiently large so that close packing does not prevent air flow through the bed. Bead sizes in the range of 10-18 mesh have been found to be satisfactory although 20-30 mesh beads are also operative.

Heating apparatus 40 is substantially illustrated to include a casing 41 having an air inlet 42 and an outlet 43. In addition, a blower fan 44 is disposed within casing 41 and a heating element 45 is located between the fan 44 and the outlet 43. The blower fan may be driven by a suitable motor 46 which may be selectively connected to a power source 47 by a switch 48 which is also operable to connect the heating element to source 47. The temperature of the air exiting the outlet may be adjusted in any suitable manner such as by a thermostatic control 48 which is operative to open a switch 50 to de-energize element 45 when the air temperature rises above a predetermined value and which closes switch 50 to energize heating element 45 when said temperature falls below a preselected value. For example, thermostatic control 48 may be of the bimetallic type which deflects or coils in relation to its temperature and which carries a movable contact at one end for opening or closing a circuit when moved through an angle established by a second contact whose position is selectively operable in relation to the desired temperature. Also, the resistance of element 45 may be adjusted to preselected nominal temperature values by any conventional adjustment means 51. As an alternate means of temperature control, a shutter (not shown) may be provided at the air inlet 42 for controlling the air velocity whereby decreasing air velocity increases temperature and increasing air velocity decreases air temperature.

The outlet 43 of heating apparatus 40 is coupled to receptacle 20 by means of a nozzle 52 which extends through an opening 54 in end wall 22. A gasket 55 may be disposed between nozzles 52 and opening 54 to prevent the backflow of air through said opening.

A number of suitable heaters are commercially available for use in the apparatus according to the present invention. One suitable heater is the model E 750-X Heat-Blow Gun manufactured by Milwaukee Lock & Mfg. Co., Milwaukee, Wis. This blower includes a thermostat for controlling the temperature between ambient temperature and 750° F. With the standard nozzle having a diameter of 1 ¼ inches, the blower injects approximately 35 cubic feet per minute of air into the plenum 25 at a nozzle velocity of 3,000 feet per minute. While a specific method of air heating is provided, it will be appreciated that any suitable source of heating air may be employed. It will also be appreciated that the pressure below screen 24 is preferably at least sufficient to cause some agitation of the beads 30. This will be dictated to some extent on the size of the openings in screen 24 and the degree of agitation desired. For example, if screen 24 is replaced by a porous plate, a higher pressure would be required to obtain the desired results.

The operation of the present invention will now be illustrated with reference to the process of inserting lenses into eyeglass frames 70. Thermostat 50 and control 51 of heater 40 are set to the desired temperature at which eyeglass frame plastics soften to the desired degree although temperatures of about 200° F. to 300° F. may be employed depending on the material from which the frames 70 are fabricated. Heated air, symbolized by arrows 60 enters plenum 25 and passes upwardly through member 24 and the beds 30 and escapes to the atmosphere. The upward movement of heated air 60 causes a slight agitation of the particles 31 to promote uniform heat distribution.

After an initial heat-up period which may be a short as a few minutes or less, the eyeglass frames 70 are lowered into the bed 30. Due to the high heat capacity of the beads and the heated air 60, the frames are quickly warmed to the desired temperature in as little as five seconds. The frames 70 may then be removed and the lens (not shown) may be snapped into or out of the lens openings 71 in the conventional manner. If the frames 70 are thermoplastic, the heating will soften the same permitting insertion or removal of the lens while metallic frames will expand to permit the same operation.

Measurements taken at varying bed depths indicated that the temperature differential in the bed may be as little as about 5° F., so the immersed frames are uniformly heated. Also, the time or depth of insertion is not critical as the result of substantially uniform temperatures throughout the bed.

While the invention has been illustrated and described with respect to heating eyeglass frames, it can also be employed for sterilizing medical instruments and supplies. For such applications, the temperature would have to be sufficient for sterilization purposes, about 300° F.

The relatively large bead size and the openness of the screen 24 insure that the air pressure within the plenum chamber 25 is relatively low i.e. only slightly above atmospheric pressure. This insures that only a relatively small motor 46 is required. In fluidized bed apparatus, on the other hand, where a porous plate and relatively smaller particles are employed, relatively high pressures are necessary in order to elevate the particles and cause their free circulation. As a result, fluidized bed heating apparatus require large air compressors.

Figure 2:
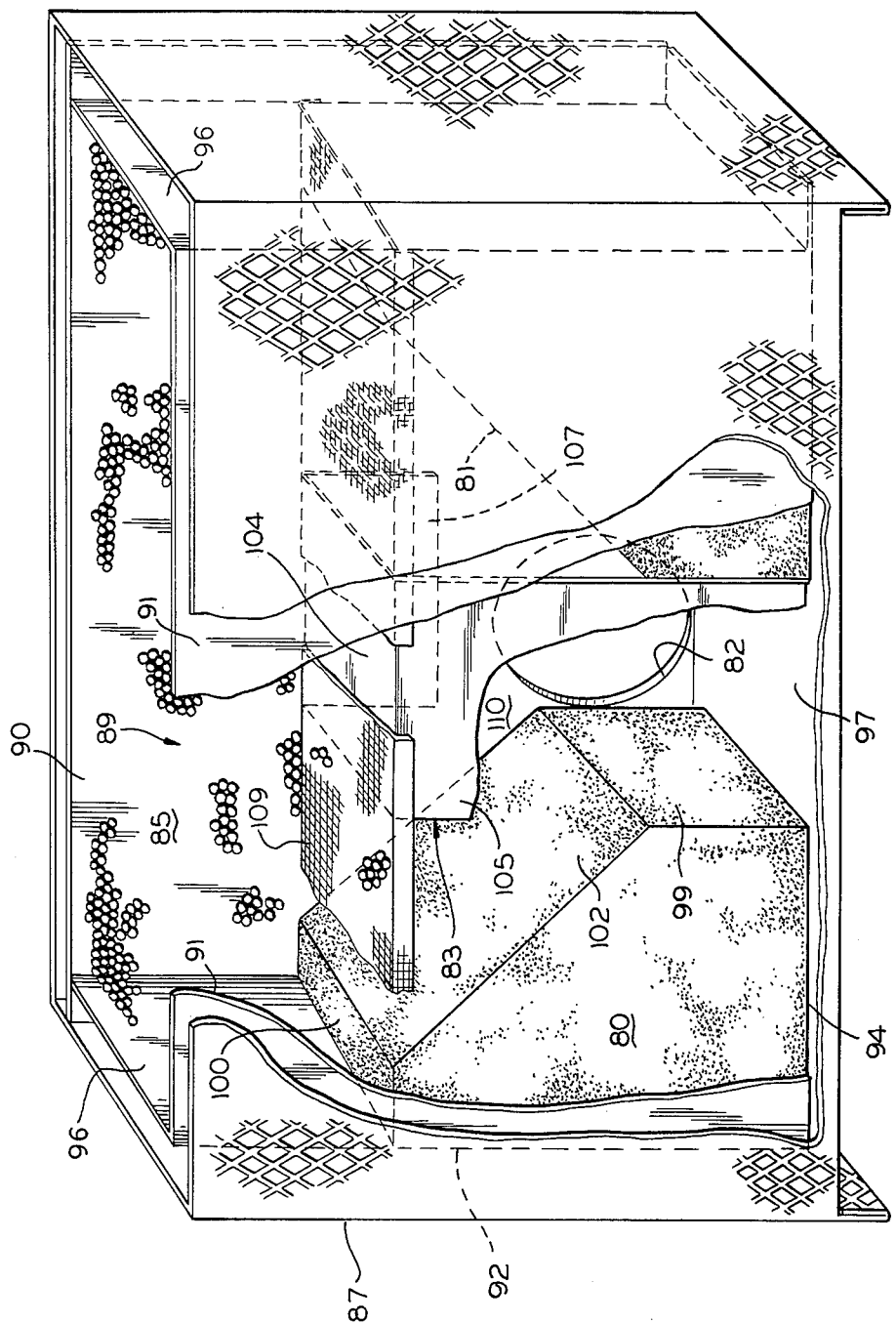
FIG. 2 is a side elevational view, partly in section, of an alternate embodiment of the invention.

FIG. 2 shows an alternate embodiment of the invention to include a pair of side baffles 80 and 81 disposed in an opposed relation and on the opposite sides of a heated air opening 82 and a top baffle 83 disposed generally above opening 82. The baffles 80, 81 and 83 provide more uniform temperature conditions within the bed of heat retentive particles 85 and in addition, baffles 80 and 81 which are preferably of a material, such as foam glass, which acts as a heat sink for absorbing heat and radiating the same to bed 85 thereby tending to stabilize its temperature.

The apparatus of FIG. 2 is provided with an expanded metal shell 87 which is generally rectangular in vertical and horizontal cross sections and is open at its upper end. A container portion 89 is disposed within the shell 87 and has the same general configuration with its wall spaced from the walls of shell 87 to minimize the conduction of heat therebetweeen. The heater opening 82 is formed in the back wall 90 of container 89 and a similar opening (not shown) is formed in the back wall of shell 87. It will be understood that a heater (not shown) but similar to that shown in FIG. 1 is connected to opening 82 for delivering low pressure heated air at a relatively high volume to the container 89.

The baffles 80 and 81 are rectangular in horizontal cross section and extend from the rear wall 90 to the front wall 91 of container 89. In addition, each baffle 80 and 81 is pentagonal in vertical cross section with its rear surface 92 and its bottom surface 94 respectively engaging the side wall 96 and bottom 97 of container 89. A front surface 99 of each baffle 80 and 81 extends from bottom surface 94 and is arranged generally vertically and adjacent the opening 82. In addition, an upper surface 100 extends generally horizontally and inwardly from the rear surface 92 of each baffle 80 and 81 and an oblique surface 102 extends between surfaces 99 and 100.

Baffle 83 may be formed of sheet metal and is bent to provide a generally horizontal planer top surface 104 which is in general alignment with the surfaces 100 of baffles 80 and 81 and is disposed above the opening 82. In addition, baffle 83 includes a front leg 105 which extends downwardly along the front wall 91 of container 89 and a rear leg 107 which extends a partial distance downwardly along the back wall 90 of said container. Legs 105 and 107 are suitably affixed to walls 91 and 90, respectively, with the top surface 104 and the surfaces 100 of baffles 80 and 81 forming a support for the particle support screen 109. As seen in FIG. 2, screen 109 extends horizontally across the container 89 to divide the same into a plenum chamber 110 disposed below the screen and the particle bed 85 disposed thereabove.

In operation of the embodiment of FIG. 2, the heated pair is delivered to the plenum chamber 110 through opening 82 and the same is directed upwardly in a direction generally parallel to the surfaces 102 of baffles 80 and 81 and through the screen 109 in the areas between the surface 104 of baffle 83 and the surfaces 100 of baffles 80 and 81. This tends to promote homogeneous heating of the particles within bed 85. In addition, after a period of operation, the baffles 80 and 81 tend to attain the temperature of the incoming heated air and thereby promote temperature stabilization.

It has been found that with a bed volume of sixty-four square inches and a 10–18 mesh bead size, a Model HC 201 Heat Gun manufactured by Master Appliance Corporation of Racine, Wisconsin was found to be satisfactory for eyeglass applications. This heater includes an inlet control shutter and provides air volume of 18.5 cfm and an air velocity of about 2250 fpm with the shutter open.

While only two embodiments of the present invention have been illustrated and described, it is not intended to be limited thereby but only by the scope of the appended claims.

I claim:

1. A method for heating eyeglass frames to permit insertion of lenses therein comprising:

containing a quantity of heat retentive particles having a regular shape in a container over a screen having openings sized to permit the free flow of air therethrough, injecting heated air into a plenum chamber below said screen at a pressure only slightly in excess of atmospheric pressure and insufficient to fluidize said beads and at a sufficient flow rate to heat said beads, passing said air freely upwardly through said screen to slowly agitate said beads while maintaining the beads in contact with adjacent beads, inserting at least the rim portion of said frames into said particles for a time sufficient to heat the same to a deformable state.

2. The method as set forth in claim 1 wherein said heat retentive particles comprise glass beads, diverting the air flow in said plenum chamber to uniformly heat said beads, and storing heat from said heated air in heat sink means disposed in said plenum chamber for radiating the same to said beads to stabilize the temperature thereof.

* * * * *